United States Patent [19]
Roland et al.

[11] 3,792,287
[45] Feb. 12, 1974

[54] NON-LINEAR OPTICAL CRYSTAL AND DEVICES

[75] Inventors: George W. Roland, Monroeville; John D. Feichtner, Murrysville, both of Pa.

[73] Assignee: Westinghouse Electric Corporation, Pittsburgh, Pa.

[22] Filed: Sept. 17, 1971

[21] Appl. No.: 181,409

[52] U.S. Cl........... 307/88.3, 321/69 R, 331/107 R, 423/508
[51] Int. Cl............................ H03f 7/00, H02m 5/00
[58] Field of Search .. 423/508; 307/88.3; 321/69 R; 331/107 R

[56] References Cited
UNITED STATES PATENTS
3,033,693   5/1962   Carnall et al. ..................... 106/47 Q

OTHER PUBLICATIONS

Chemical Abstracts, Vol. 63, Col. 14201 (1965).

Kolomiets et al., "Steklo I Keramika," No. 8, pp. 10–12 (Aug. 1963).

*Primary Examiner*—Roy Lake
*Assistant Examiner*—Darwin R. Hostetter
*Attorney, Agent, or Firm*—R. D. Fuerle

[57] ABSTRACT

A compound of the formula $Tl_3AsSe_3$ is disclosed. It can be made into large, optically useful crystals which are birefringent and display nonlinear optical properties in the infrared. A harmonic generator, an optical parametric oscillator, and an optical frequency upconverter incorporating this crystal are also disclosed.

25 Claims, 5 Drawing Figures

PATENTED FEB 12 1974 3,792,287

NON-LINEAR OPTICAL CRYSTAL AND DEVICES

BACKGROUND OF THE INVENTION

A useful phenomenological description of the interaction of light with matter is obtained by considering the interaction of the alternating transverse electric field associated with a light ray, with the bound charges (electrons, positive ions, and negative ions) making up the material (see N. Bloembergen, "Nonlinear Optics," W.A. Benjamin, Inc. N.Y. (1965)). When light enters a linear optical crystal its electric field, $\vec{E}$, generates a polarization in the crystal by displacing positive charges in one direction and negative charges in the opposite direction. The bound charges follow the applied field, accelerating and moving in synchronism with it, and thus reradiate a light ray similar in direction and frequency to the incident ray. In linear optical crystals, the displacement of the charges is the same for the two opposing directions of the electric field $\vec{E}$, but in nonlinear optical crystals, as a result of the crystal structure, the displacement is greater for an $\vec{E}$ field in one direction than in the opposite direction. As a result of the asymmetric motion, the bound charges in nonlinear crystals generate a reradiated wave which is not identical to the driving wave in that it contains small admixtures of higher harmonics of the incident wave, the second harmonic being of particular interest. The efficiency of conversion to the second harmonic depends on the magnitude of the nonlinear optical susceptibility, which is related to the crystal composition and structure, and on the volume of the crystal which is effective in acting as a coherent generator of the second harmonic wave.

In the simplest case, this volume is limited by the fact that due to normal dispersion of the refractive indices of the material, the second harmonic ray propagates more slowly through the crystal than does the fundamental ray. As a result, at a given point in the crystal the harmonic ray derived from the fundamental in, say, the first part of the crystal may be out of phase with that derived from the fundamental in a succeeding part of the crystal, resulting in destructive interference of the generated second harmonic wave, and severe limiting of the effective volume for coherent generation of the second harmonic.

In birefringent nonlinear crystals, however, this problem can be overcome by taking advantage of the fact that in such a crystal, there are different effective light propagation velocities, depending on the polarization of the beam and its propagation direction in the crystal (see J.A. Giordmaine, "Mixing of Light Beams in Crystals," Phys. Rev. Lett. 8, 19 (1962) and P.D. Maker, et al., "Effects of Dispersion and Focusing on the Production of Optical Harmonics," Phys. Rev. Lett. 8, 21(1962)). As an example, in a uniaxial negative birefringent crystal an extraordinary ray (i.e., one which is polarized with its $\vec{E}$-vector parallel to the crystal c-axis) travels at a faster speed than does the ordinary ray (i.e., one which is polarized with its $\vec{E}$-vector perpendicular to the crystal c-axis). The difference in speeds increases as the direction of propagation of the extraordinary ray is shifted away from the c-axis and is at a maximum when the extraordinary ray propagation direction is normal to the c-axis. Making use of the fact that through the anisotropic properties of the nonlinear susceptibilities an ordinary fundamental ray generates an extraordinary second harmonic ray, one can increase the speed of the extraordinary second harmonic ray by increasing its angle of propagation to the c-axis until at some angle, known as the "phase-matching angle," $\theta_m$, its speed will equal the speed of the fundamental ray propagating as an ordinary ray. Then the contributions to the second harmonic ray from fundamental radiation in all parts of the fundamental ray will be in phase, and the second harmonic output and the conversion efficiency will be optimized.

SUMMARY OF THE INVENTION

The compound of this invention has the formula $Tl_3AsSe_3$. It may be formed into large, single crystals of the same formula. The crystals may be used in a harmonic generator, an optical parametric oscillator, an optical frequency upconverter, or other nonlinear optical devices such as an amplifier.

ADVANTAGES OF THE INVENTION

The compound of this invention can be easily formed into large, optically useful crystals having large nonlinear optical characteristics in the infrared and a degree of birefringence which permits phase-matching over a wide range of wavelengths but is not so great as to cause a high degree of Poynting vector walkoff (a divergence of the ordinary and extraordinary rays in the crystal which limits the useful length of the crystal, see G.D. Boyd et al., "Second Harmonic Generation of Light with Double Refractor," Phys. Rev. 137, A 1305(1965)). The crystal is transparent over a wide range of wavelengths and has a high index of refraction which gives it a high figure of merit (a measure of the optical parametric power conversion efficiency, see S.E. Harris, "Tunable Optical Parametric Oscillators," Proc. IEEE 57, 2095 (1969)). Unlike many nonlinear optical crystals, the crystal of the invention is not temperature sensitive and therefore rigid temperature controls are not needed to maintain a fixed frequency output. Also, it does not have an absorption loss at 10.6 $\mu$m as do proustite (see K.F. Hulme, O. Jones, P.H. Davies, and M.V. Holden, "Synthetic Proustite ($Ag_3AsS_3$): A New Crystal for Optical Mixing," Appl. Phys. Lett. 10, 133(1967)), and pyrargyrite ($Ag_3SbS_3$), (see W. Bardeley and O. Jones, "On the Crystal Growth of Optical Quality Proustite and Pyrargyrite," J. of Crystal Growth 3, 4, 168(1968)), and it is more crack-resistant and less subject to surface damage at high power densities.

PREPARATION OF COMPOUND AND CRYSTAL

The compound of this invention, $Tl_3AsSe_3$, may be prepared by mixing together very pure stoichiometric quantities of the elements involved and melting them to a homogenous mass (they melt congruently).

A crystal may be prepared by the Stockbarger technique in which the compound is sealed in a quartz tube under argon, melted, and lowered very slowly through a two-zone furnace having a steep temperature gradient at the melting point of the compound, about 316° ± 2°C.

THE CRYSTAL

The crystal of this invention is negatively uniaxial, piezoelectric, and rhombohedral. Its space group is $R3m$, its Laue class is $32/m$, and the diffraction aspect derived from X-ray data is $R^{**}$. The length of the a-axis of the crystal is about 9.90 A and the c-axis is about 7.13 A, and the transparency region is about 1.25 to about 17μm. The figure of merit ($d^2/n^3$) (see S.E. Harris, "Tunable Optical Parametric Oscillators," Proc. IEEE 57, 2095(1969)) with respect to potassium dihydrogen phosphate is about 600 and the nonlinear optical coefficient d with respect to proustite is at least three. The following table gives the measured refractive indices of the crystal.

| Wavelength λ(μ m) | Uncertainty in λ(μm) | $n_o$ | $n_e$ |
|---|---|---|---|
| 1.553 | <0.1 | 3.443 | 3.248 |
| 2.66 | 0.1 | 3.356 | 3.170 |
| 3.27 | 0.19 | 3.339 | 3.152 |
| 3.365 | 0.13 | 3.337 | 3.155 |
| 3.38 | 0.32 | 3.339 | 3.152 |
| 4.35 | 0.18 | 3.331 | 3.148 |
| 4.46 | 0.34 | 3.334 | 3.142 |
| 4.55 | 0.43 | 3.326 | 3.142 |
| 5.26 | 0.6 | 3.321 | 3.1405 |
| 5.3 | 0.2 | 3.326 | 3.142 |

The crystals should be as long as possible in order to maximize the output power, but a crystal as small as 1 mm long can be optically useful. The width of the crystal should be at least as wide as the input beam can be focused.

The crystal preferably has two parallel polished faces at about 20° to about 60° to its c-axis since nonlinear optical phenomenon are most easily observed when the input beam is within that range of angles to the c-axis and the input beam is preferably about normal to the faces in order to facilitate alignment.

THE DRAWINGS

HARMONIC GENERATOR

In the harmonic generator a beam of coherent light of a fundamental wavelength is directed at the crystal at the phase-matching angle for the generation of the desired harmonic. The phase-matching angle will depend upon the wavelength of the fundamental, but may be easily determined experimentally by orienting the crystal until the harmonic is detected. Detectable harmonic generation generally requires a minimum fundamental power density of at least about 10 watts/cm². Since conversion efficiency is proportional to power density, the fundamental is preferably focused near the center of the crystal to maximize conversion efficiency, and since usually the ordinary polarization of the fundamental generates the harmonic, the fundamental is preferably an ordinary ray. As will all optical devices the input and output rays must be within the transparency region of the crystal.

Figure 1:
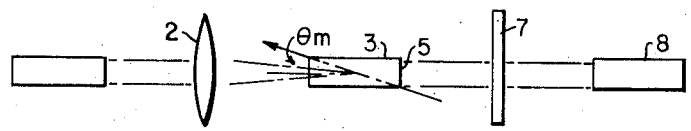
FIG. 1 is a diagrammatic drawing of a harmonic generator.

FIG. 1 illustrates an example of a harmonic generator according to this invention. A laser 1 generates a coherent beam of light at the fundamental wavelength which is focused by lens 2 at the center of crystal 3 which has two polished parallel faces 4 and 5. The beam is normal to face 4 which is cut with its normal at the phase-matched angle $\theta_m$ to the c-axis of the crystal. The harmonic leaves face 5 with the fundamental ray but filter 7 blocks the fundamental ray and only the harmonic ray strikes detector 8.

OPTICAL PARAMETRIC OSCILLATOR

While the only quantitative output of a harmonic generator is the second harmonic, an optical parametric oscillator can theoretically generate any frequency lower than the fundamental (within the transparent region of the crystal). In one version of an optical parametric oscillator a coherent extraordinary fundamental ray generates a coherent ordinary signal ray and a coherent ordinary idler ray, the sum of the frequencies of the signal and idler rays equaling the frequency of the fundamental ray. Either of the two output rays may be designated as the "signal" ray for the purposes of this invention. All three rays must be within the transparency region of the crystal. The fundamental ray is preferably an extraordinary ray and is preferably focused at the center of the crystal to maximize conversion efficiency.

Figure 2:
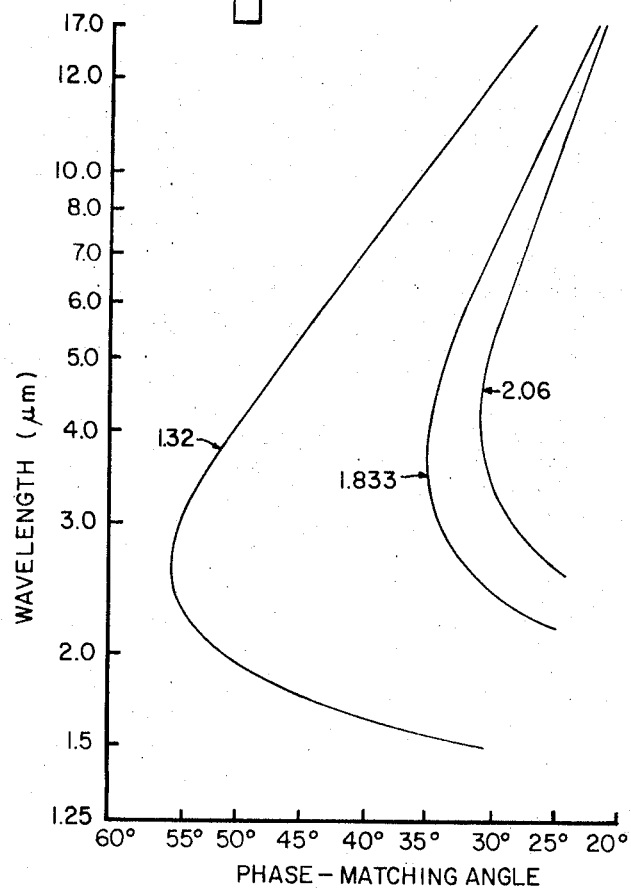
FIG. 2 is a set of curves which give phase-matching angles for parametric oscillation pumped at various fundamental wavelengths.

The angle of the fundamental ray in the crystal to the c-axis (the "phase-matching angle") determines the wavelength of the signal and idler rays. FIG. 2 gives the signal and idler wavelengths produced at different phase-matching angles of a $Tl_3AsSe_3$ crystal by fundamentals having wavelengths of 1.32 and 1.833μm, which can be obtained from a neodymium-doped YAG (yttrium-aluminum-garnet) laser and of 2.06μm, which can be obtained from a holmium-doped YAG or SOAP (silica-oxy-apatite) laser. For example, FIG. 2 shows that a fundamental of 1.32μm generates signal and idler rays of about 1.92μm and 4.12μm at a phase-matching angle of 50°. The phase-matching angle may be determined experimentally by moving the crystal until the desired signal wavelength is obtained or it may be calculated. See the British Journal of Applied Physics, Vol. 16, pages 1,135–1,142 (1965) for calculations. A minimum power density of 10 watts/cm² is preferable for a significant output. Various optical devices and controls known to the art, such as mode-locking and phase and amplitude modulation may be used if desired.

EXTERNAL CONFIGURATION

Figure 3:
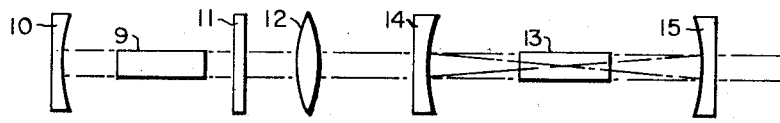
FIGS. 3 and 4 are diagrammatic drawings of optical parametric oscillators, FIG. 3 being an external configuration and FIG. 4 being an internal configuration.

FIG. 3 illustrates an optical parametric oscillator in an external configuration according to this invention. A laser 9 having mirrors 10 and 11 generates a fundamental ray which is focused by an optional lens 12 into the center of crystal 13. At the ends of crystal 13 are mirrors 14 and 15, the common optical axis of which is parallel to the fundamental ray in the crystal. These mirrors are preferably confocal (i.e., the radius of curvature of each mirror is at the center of the opposite mirror), have their focal points at the center of the crystal, and are close to the crystals in order to limit the space between them and the crystal to decrease diffraction loss; a radius of curvature of about 2 to 3 times the length of the crystal is generally satisfactory. These mirrors may be deposited directly on the crystal but this is not preferred as it limits the ability to tune since tilting the crystal would make the mirror axis nonparallel to the incoming fundamental ray. Mirror 14 is transparent to the fundamental ray and reflecting to the signal ray and mirror 15 is partially reflecting to the signal ray where "partially" generally means about 20 to 98 percent reflecting (the remaining light being transmitted), although a mirror which is about 95 percent reflecting is most commonly used. Mirror 15 is also preferably reflecting of the fundamental ray to produce a "double pass" of the ray through the crystal. In a singly resonant system both mirrors are transparent to the idler ray and in a doubly resonant system they are both reflecting to the idler ray. A portion of the signal ray generated in the crystal is multiply reflected between the mirrors to provide sufficient overall gain, to overcome threshold losses, and to build up the signal, and the rest of the signal ray escapes through mirror 15 as the output.

INTERNAL CONFIGURATION

Figure 4:
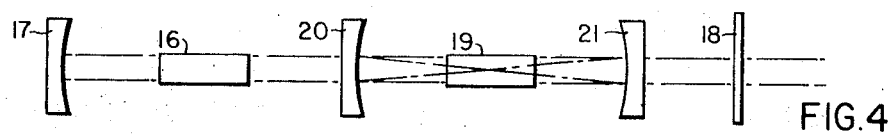

FIG. 4 shows an optical parametric oscillator according to this invention of the internal configuration which has a better conversion efficiency than the external configuration, although there is a tendency for the output to fluctuate due to interaction between the laser and the oscillator which is not encountered in the external configuration.

The stimulated emission of the fundamental ray occurs in lasing medium 16 as the fundamental ray is reflected between laser mirrors 17 and 18. As the fundamental ray passes through crystal 19 the signal and idler rays are generated and amplified as they are reflected between mirrors 20 and 21; these mirrors are transparent to the fundamental ray. Preferably, mirror 20 is reflecting to the signal ray, mirror 21 is partially reflecting to it, and mirror 18 is transparent to it; the two mirrors 18 and 21 may be combined into a single mirror, if desired, in order to reduce losses. In a singly resonant system mirrors 20 and 21 are transparent to the idler ray and in a doubly resonant system they are reflecting to it.

OPTICAL FREQUENCY UPCONVERTER

An optical frequency upconverter combines two rays of light, preferable both coherent although one may be non-coherent, into a signal ray whose frequency is the sum of the frequencies of the two input rays. It is useful, for example, in detecting an input ray which is otherwise of too low a frequency to be detectable. The three rays are phase-matched for maximum conversion efficiency and lie within the transparency region of the crystal. The input rays are preferably focused into the center of the crystal, are polarized and have a power density of at least 10 watts/cm² each.

Figure 5:
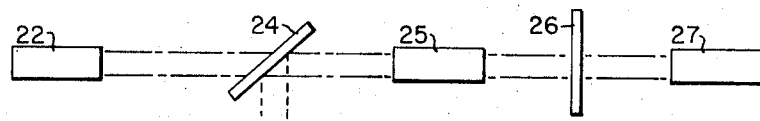
FIG. 5 is a diagrammatic drawing of an optical frequency upconverter.

In FIG. 5, which illustrates an optical frequency upconverter according to this invention, light from two sources 22 and 23, at least one of which produces coherent light, is combined by mirror 24 into a single beam which is directed at crystal 25. Filter 26 blocks the portions of the two input rays which emerge from the crystal, permitting the signal ray to enter detector 27.

EXAMPLE

The following example further illustrates this invention.

The elements thalium, arsenic, and selenium were carefully weighed in amounts of 9.9435 grams, 1.2150 grams, and 3.8415 grams, respectively, and sealed under vacuum in a quartz tube. The tube was heated at 600°C for several hours to obtain a homogeneous liquid. It was then cooled to room temperature and the $Tl_3AsSe_3$ granules which had formed were placed in a 12 mm I.D. quartz tube about 14 in. long having a 2 mm I.D. necked portion about 1 in. from the bottom. The tube was then sealed under 0.8 atmospheres of pure argon and passed through a two-zone furnace having a steep temperature gradient (8° to 15°C/mm) at the crystallization points (about 316° ± 2°C) at a rate of about 10 to 15 mm/day. After several days the tube was removed from the furnace, cooled to room temperature, and broken. The crystal, which had grown above the neck of the tube, was given a rough polish, orientated by X-ray diffraction, cut at an angle of 22° to its c-axis at each end, and smoothly polished. The final cylindrical crystal was about 3 cm long and 8 cm in diameter.

A harmonic generator was constructed as shown in FIG. 1. The laser was a conventional $CO_2$ gas laser having a 1 meter discharge tube, the ends of which were at Brewster's angle, were coated with sodium chloride, and were oriented to provide only the ordinary plane of polarization (relative to the crystal). A flowing mixture of nitrogen, helium, and carbon dioxide was used in proportions of 8:1:1 at a pressure of 15 torr. The gas mixture was excited by a 10 KV discharge at 15 milliamps. The laser was Q-switched with a gold-coated stainless steel mirror rotation at 400 revolutions/sec. to produce an output of 400 pulses/sec. The mirror at the output end of the laser cavity was a 90 percent reflecting germanium mirror with a dielectric film coating. The output of the laser was a 10.6$\mu$m ray having an average power of about 100 milliwatts, and 1 kilowatt peak power pulses with a 400 nanosec. pulse width. The crystal, the preparation of which was just described, was placed in a gimbal mount and the laser beam was focused at the center of the crystal by a 5 cm. focal length germanium lens. The light leaving the crystal was passed through a 1 inch diameter sapphire filter one-eighth in. thick to block the 10.6$\mu$m fundamental ray. The remaining 5.3$\mu$m second harmonic ray entered a liquid nitrogen cooled gold-doped germanium detector which generated a signal, displayed on an oscilloscope. The crystal was moved until the signal on the oscilloscope was at a maximum which occurred at the phase-matched angle of 22° ± 2° to the c-axis.

The second harmonic had a peak power of about 1 watt to give a conversion efficiency of about 0.1 percent.

We claim as our invention:

1. A rhombohedral crystal having the formula $Tl_3AsSe_3$ which is at least about 1 mm. long.
2. A crystal according to claim 1 which has two polished parallel faces the space in between which is composed of said crystal.
3. A crystal according to claim 2 wherein said polished parallel faces are at about 20° to about 60° to its c-axis.
4. A harmonic generator comprising
   1. a crystal according to claim 2;
   2. means for generating a fundamental ray of coherent light; and
   3. means for directing said fundamental ray at one of said polished faces of said crystal at the angle to the c-axis of said crystal at which said ray and said harmonic are phase-matched, said fundamental ray and said harmonic having wavelengths between about 1.25 and about 17$\mu$m.
5. A harmonic generator according to claim 4 wherein the normals of both polished parallel faces of said crystal are at said phase-matched angle to the c-axis of said crystal.

6. A harmonic generator according to claim 4 wherein said fundamental ray of coherent light has a power density of at least about 10 watts/cm² and is an ordinary ray relative to said crystal.

7. An optical parametric oscillator for generating a signal ray and an idler ray from a fundamental ray, where the wavelengths of all three rays are between about 1.25μm and about 17μm comprising:
1. a crystal according to claim 2;
2. means for generating a fundamental ray of coherent light;
3. means for directing said fundamental ray at one of said polished faces of said crystal; and
4. two parallel opposing mirrors $M_1$ and $M_2$, the optical axis of which is parallel to said fundamental ray within said crystal, $M_1$ positioned between said means for generating said fundamental ray and said crystal and being transparent to said fundamental ray and $M_2$ being positioned at the opposite end of said crystal, one of said mirrors being reflecting at the wavelength of said signal ray and the other being partially reflecting at the wavelength of said signal ray.

8. An optical parametric oscillator according to claim 6 wherein said means for generating said fundamental ray of coherent light is a laser comprising:
1. a lasing masterial;
2. means for exciting said lasing material; and
3. two parallel mirrors, $m_1$ and $m_2$, positioned at opposite ends of said lasing material, $m_1$ being reflecting at the wavelength of said fundamental ray and $m_2$ being at least partially reflecting at the wavelength of said fundamental ray.

9. An optical parametric oscillator according to claim 8 wherein $m_2$ is partially reflecting at the wavelength of said fundamental ray and a portion of said fundamental ray passes through $m_2$ to said crystal.

10. A parametric oscillator according to claim 8 wherein $M_1$, said crystal, and $M_2$ are positioned between said lasing material and $m_2$, and $m_2$ is reflecting at the wavelength of said fundamental ray and is partially reflecting at the wavelength of said signal ray.

11. An optical parametric oscillator according to claim 7 wherein a lens is provided which focuses said fundamental ray at the center of said crystal.

12. An optical parametric oscillator according to claim 7 wherein said other of said mirrors is about 95 percent reflecting at said signal frequency.

13. An optical parametric oscillator according to claim 7 wherein both mirrors are reflecting at the wavelength of said idler ray.

14. An optical parametric oscillator according to claim 7 wherein the normals of both polished parallel faces of said crystal are at the phase-matched angle to the c-axis of the crystal.

15. An optical parametric oscillator according to claim 7 wherein said fundamental ray is an extraordinary ray relative to said crystal.

16. An optical parametric oscillator according to claim 7 wherein $M_2$ is reflecting at the wavelength of said fundamental ray.

17. An optical parametric oscillator according to claim 7 wherein said fundamental ray of coherent light has a power density of at least about 10 watts/cm².

18. An optical parametric oscillator according to claim 7 wherein $M_1$ is reflecting at the wavelength of said signal ray.

19. An optical parametric oscillator according to claim 7 wherein said mirrors $M_1$ and $M_2$ are confocal, have their focal points at the center of the crystal, and are located close to the crystal.

20. An optical parametric oscillator according to claim 19 wherein said mirrors $M_1$ and $M_2$ have a radius of curvature about 2 to 3 times the length of said crystal.

21. An optical parametric oscillator according to claim 10 wherein $M_2$ and $m_2$ are combined into a single mirror.

22. An optical frequency upconverter for combining two input rays of light, at least one of which is coherent, into a signal ray, the wavelengths of all three of said rays being between about 1.25μm and about 17μm comprising:
1. a crystal according to claim 2; and
2. means for directing said two rays of light parallel to each other at a face of said crystal at the angle of the c-axis of said crystal at which said rays are phase-matched.

23. An optical frequency upconverter according to claim 22 wherein each input ray is polarized and has a power density of at least about 10 watts/cm².

24. An optical frequency upconverter according to claim 22 wherein both polished parallel faces of said crystal are at about 90° to said phase-matched angle.

25. An optical frequency upconverter according to claim 22 wherein both of said input rays are coherent.

* * * * *